United States Patent [19]
Fukui

[11] Patent Number: 5,343,510
[45] Date of Patent: Aug. 30, 1994

[54] WIRELESS TELEPHONE

[75] Inventor: Satoshi Fukui, Kyoto, Japan

[73] Assignee: Murata Kikai Kabushiki Kaisha, Kyoto, Japan

[21] Appl. No.: 855,065

[22] Filed: Mar. 23, 1992

[30] Foreign Application Priority Data

Mar. 29, 1991 [JP] Japan .................................. 3-028718

[51] Int. Cl.⁵ ...................... H04M 11/00; H04M 1/00; H04M 3/00
[52] U.S. Cl. ......................................... 379/58; 379/61; 379/63; 379/361; 379/418
[58] Field of Search .................. 379/58, 61, 63, 361, 379/418

[56] References Cited

U.S. PATENT DOCUMENTS

| | | | |
|---|---|---|---|
| 4,571,462 | 2/1986 | Janssen | 379/361 |
| 4,595,795 | 6/1986 | Endo | 379/361 |
| 4,922,527 | 5/1990 | Nonami | 379/361 |
| 4,924,511 | 5/1990 | Burns et al. | 379/418 |
| 5,128,991 | 7/1992 | Murata | 379/418 |

*Primary Examiner*—Stephen Chin
*Assistant Examiner*—Vijay Shankar
*Attorney, Agent, or Firm*—Spensley Horn Jubas & Lubitz

[57] ABSTRACT

A wireless telephone has a function of monitor-outputting an operation sound as an operation key is pressed. The wireless telephone can be operated in one of three modes, namely, none push-tone output mode, normal push-tone output mode and prolonged push-tone output mode. The operation sound is generated as an user selects a certain output mode by pressing the operation key. Monitor outputs from a speaker of tile wireless telephone vary with tile output mode. Specifically, a single sound is output from the speaker if the none push-tone output mode is selected. The push-tone is output from the speaker if the normal or prolonged push-tone output mode is selected. In the normal push-tone output mode, tile push-tone is output for a constant predetermined period of time (for example, 100 msec). In the prolonged push-tone output mode, the push-tone is output for a period of time as the operation key is kept pressed. However, if the key pressing period of time is 150 msec or less, for example, the push-tone generating period is prolonged to 150 msec.

15 Claims, 8 Drawing Sheets

WIRELESS TELEPHONE

TECHNICAL FIELD

The present invention relates to improvements of wireless telephones.

BACKGROUND ART

Generally, a wireless telephone includes a main body and an antenna. The main body is designed compact so that an user can carry it within his hand. The antenna is provided to receive and send radio signals. A key operation part which includes a ten-key is provided in the main body so that the user can input a telephone number and perform a remote control through a push-tone service or push-button telephone service.

Since calling information from the wireless telephone to the other telephone or station are transmitted in the form of digital signals, dial pulses or push tones are not necessary to the wireless telephone, but tile wireless telephone should be provided with a push-tone signal mode so as to be enable to take advantage of the push-button telephone service.

When the user of tile wireless telephone uses the push-button telephone service, the user should switch the mode of the wireless telephone into the push-tone signal mode. With the push-tone signal mode, the push-tone signals are generated and output from the wireless telephone. Further, since generally the wireless telephone is provided with more than one push-tone signal mode, it is necessary to display which signal mode is now set up. Usually, a display for indicating the signal mode is provided in the main body of the wireless telephone, and the user should confirm which signal mode is now set up by seeing the display every time he uses the wireless telephone.

With the conventional wireless telephone, the user cannot know the signal mode until he sees the display. As a result, the push-tone is unexpectedly generated if the user accidentally touches the ten-key during the telephone communication, or the push-tone is not generated when the user wants to generate it.

In addition, when the user refers to a bank account or performs a remote control savings transfer or train reservation, the conventional wireless telephone outputs the push tone for only 100 msec or so regardless of a key-pressing period of time. Consequently, under a bad radio wave condition, sufficient instruction signals are not transmitted from the wireless telephone and this results in a false signal transmission.

SUMMARY OF THE INVENTION

The present invention intends to eliminate the above-described problem and its primary object is to provide a wireless telephone by which the user can know which signal mode is selected by only hearing key operation sound, without confirming the signal mode on the display as indicated upon manipulating function keys. In addition, the present invention provides a wireless telephone which can output a push tone signal for an appropriately extended period of time if the radio wave transmission condition is bad.

To achieve these objects, the present invention provides, according to one aspect thereof, & wireless telephone comprising a key input control part for outputting a key operation signal corresponding to a pressed operation key, a push-tone signal mode selection switch for switching and setting a push-tone signal mode upon a key pressing operation into a none push-tone output mode, a normal push-tone output mode or a prolonged push-tone output mode, an operation sound generating circuit for generating an operation sound and a control part for sending to the operation sound generating circuit an operation sound signal corresponding to a selected signal output mode, with the key operation signal and a mode selection signal selected by manipulating the push-tone signal mode selection switch being input to the control part.

With the above described wireless telephone, one of following three modes can be selected by manipulating the push-tone signal mode selection switch:

(1) No push-tone output mode

If an operator selects the no push-tone output mode with the push-tone signal mode selection switch, the control part processes the key operation signal input from the key input control part and outputs the single sound drive signal to the operation sound generating circuit. As a result, a predetermined single sound of "[pi]" is output through a speaker for confirmation of an operation key pressing manipulation as the operation key is pressed. In this case, however, the push-tone is not transmitted to the other party (a party which the operator talks to).

(2) Normal push-tone output mode

If the operator selects the normal push-tone output mode with the push-tone signal mode selection switch, the control part processes the key operation signal input from the key input control part and outputs a push-tone drive signal to the operation sound generating circuit. In this case, the operation sound generating circuit is activated for a predetermined period of time (for example, 100 msec) regardless of how long the key is being pressed, like a conventional wireless telephone, and then outputs the push-tone signal to the speaker. At the same time, the push-tone signal is transmitted to the other party from the wireless transmission part.

As a result, a normal push-tone is output from the speaker, and a radio frequency signal is modulated with the input push-tone in the wireless transmission part and the modulated signal is output from the wireless transmission part. Accordingly, it is possible to perform a push-button telephone service such as a transaction of bank account.

(3) Prolonged push-tone output mode

If the operator selects the prolonged push-tone output mode with the push-tone signal mode selection switch, the control part processes the operation signal input from the key input control part and outputs the push-tone drive signal to the operation sound generating circuit.

In this case, the control part keeps sending the push-tone drive signal to the operation sound generating circuit for a period of time that the key is being pressed. Consequently, by constantly pressing the key for a sufficient period of time, it is possible to insure a sufficient outputting period of time for the push-tone signal. As a result, transmission errors based on bad electric wave conditions, which are likely to occur if conventional systems are used, are reduced and reliability is improved.

If the key pressing period of time is short (for example, not more than 150 msec), the outputting period of time for the push-tone drive signal is prolonged to a certain period of time (for example, 150 msec).

These and other aspects, objects and advantages of the present invention will be apparent from a following detailed description as read with the accompanying drawings and appended claims.

DESCRIPTION OF THE PREFERRED EMBODIMENTS

Now, a preferred embodiment of a wireless telephone according to the present invention will be described with reference to the accompanying drawings.

Figure 1:
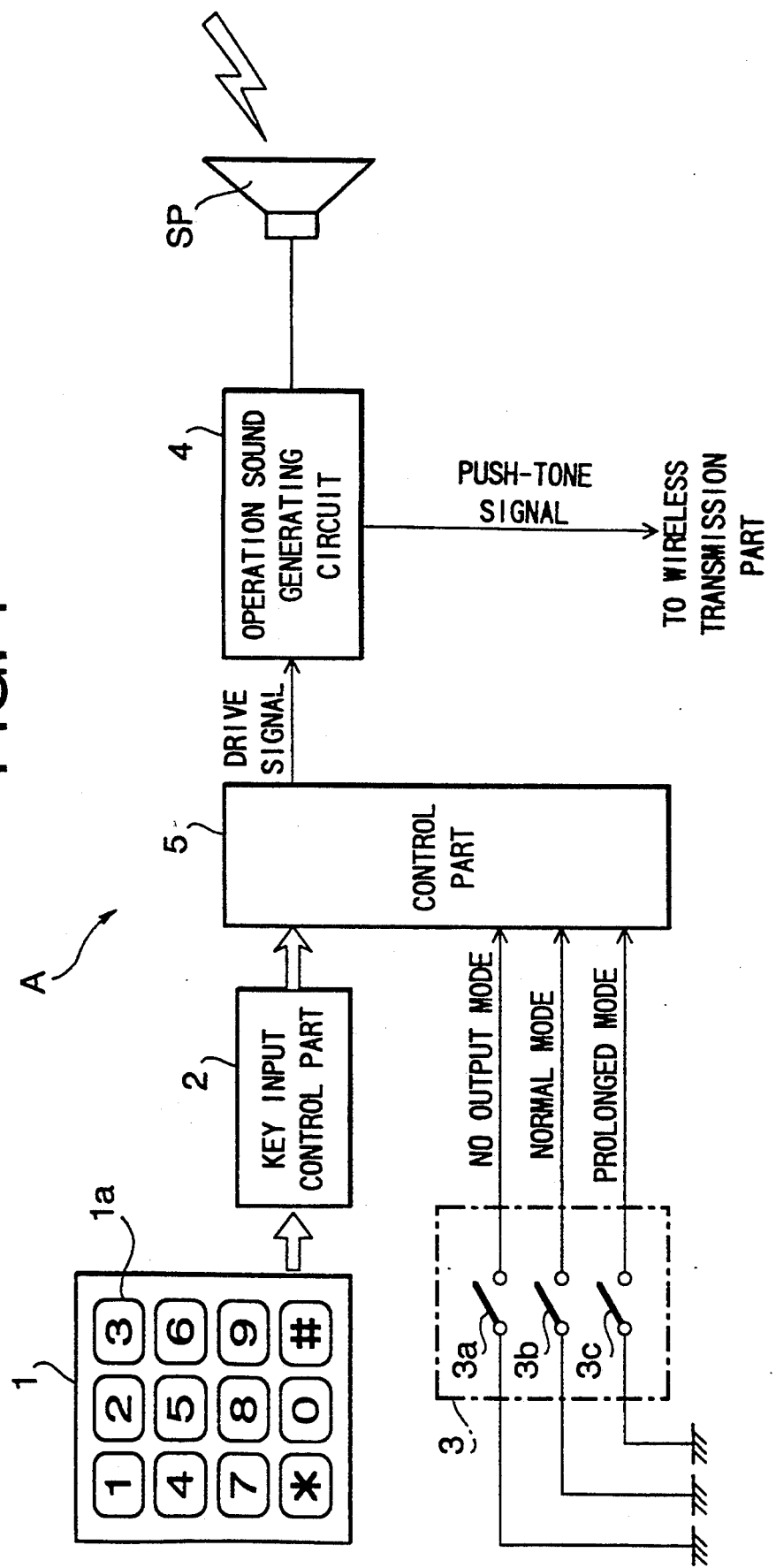
FIG. 1 is a block diagram showing a main structure of a wireless telephone according to the present invention.

Illustrated in FIG. 1 is a block diagram of the major elements of the wireless telephone A of the present invention. The wireless telephone A includes a key input control part 2, a push-tone signal mode selection switch 3, and a control part 5. The key input control part 2 detects a pressed operation key among a key operation part 1 and outputs a key operation signal corresponding to the pressed operation key. The key operation part 1 is provided with an operation key 1a such as a ten-key. The push-tone signal mode selection switch 3 includes selection switches 3a, 3b and 3c which respectively correspond to a no push-tone output mode, a normal push-tone output mode and a prolonged push-tone output mode. With these switches, an operator can select a desired signal output mode. The control part 5 processes the key operation signal from the key input control part 2 and a mode selection signal from the mode selection switch 3 and then transmits to an operation sound generating circuit 4 a drive signal which is used to obtain a monitor output corresponding to a selected signal mode. Here, the key input control part 2 incorporates a known key matrix control circuit and other elements such that when a certain operation key 1a of the key operation part 1 is manipulated, a key operation signal which is beforehand assigned to the operation key 1a is output (each operation key is given a key operation signal unique thereto), and when the manipulation of the operation key 1a is released (or when the operation key 1a is released from the pressed condition), the outputting of the key operation signal is stopped.

As the operation sound generating circuit 4 receives the drive signal from the control part 5, a certain preassigned single sound signal or push-tone signal is output based on the mode selection signal selected by the mode selection switch 3. The single sound signal or push-tone signal is converted into a tone of audio frequency by a speaker SP and output as the monitor output.

The push-tone signal output form the operation sound generating circuit 4 is also sent to a wireless transmission part 7 (described below). In the wireless transmission part 7, the radio frequency signal is modulated and output from an antenna 6 in the form of a radio wave signal.

Figure 2:
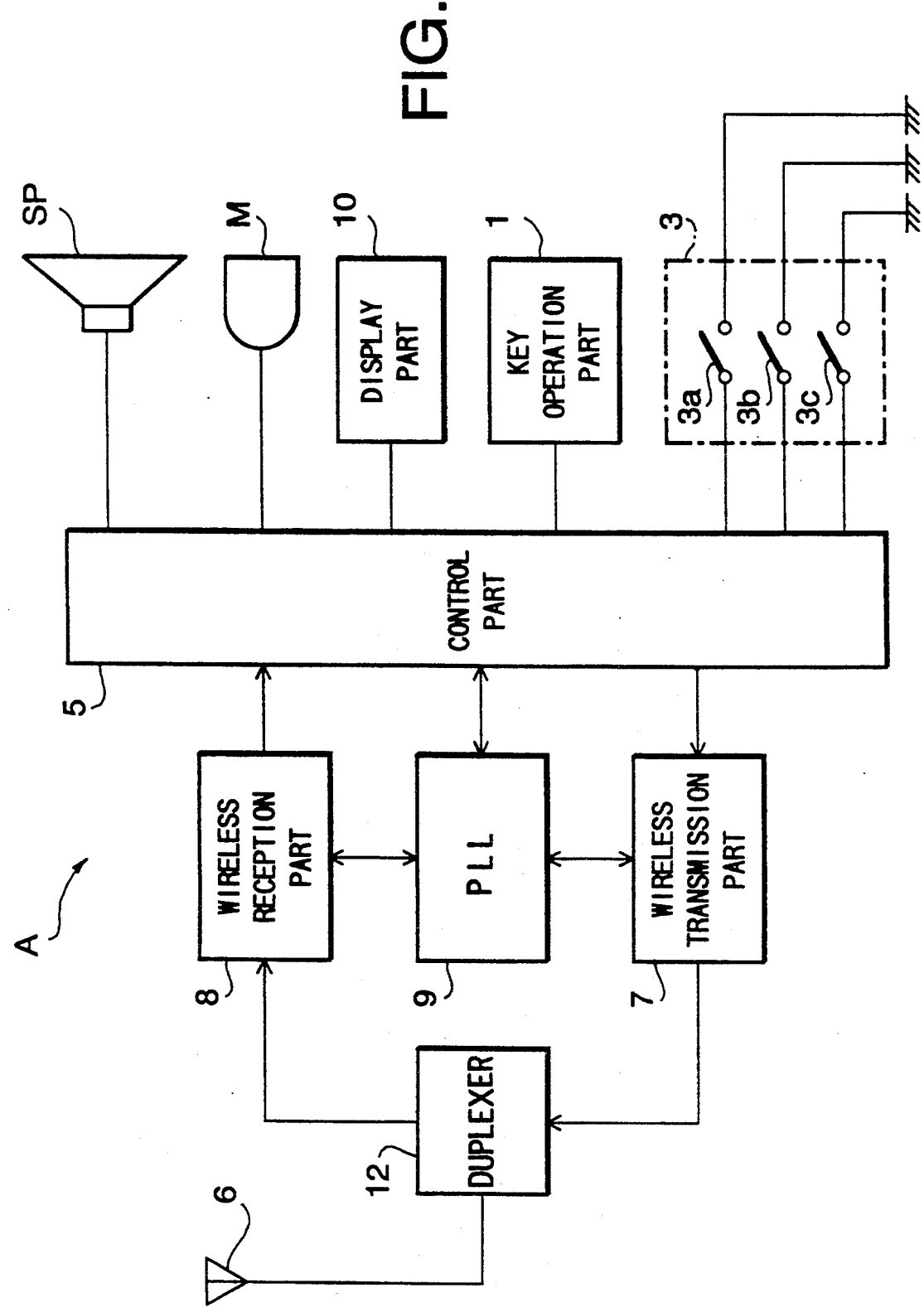
FIG. 2 is a block diagram showing a basic internal structure of the wireless telephone according to the present invention.

Referring to FIG. 2, a fundamental internal structure of the wireless telephone A is illustrated. The wireless control part includes a wireless transmission part 7, a wireless reception part 8 and a duplexer 12. The wireless transmission part 7 modulates the audio frequency signal and/or push-tone signal produced by the operation sound generating circuit 4, and then outputs the modulated signal from the antenna 6. The control part 5 includes a micro computer. The wireless reception part 8 receives the radio frequency signal at the antenna 6 and demodulates it to pick up a arrival and reception signal. The duplexer 12 is connected to the antenna 6. The frequency setting of the wireless reception part 8 and the wireless transmission part 7 is performed by a PLL circuit 9 based on an instruction signal from the control part 5.

Numeral 10 designates a display part for displaying information necessary for the communication (various kinds of data, messages and so on), "SP" is a speaker and "M" represents a microphone necessary for the communication.

Figure 3:
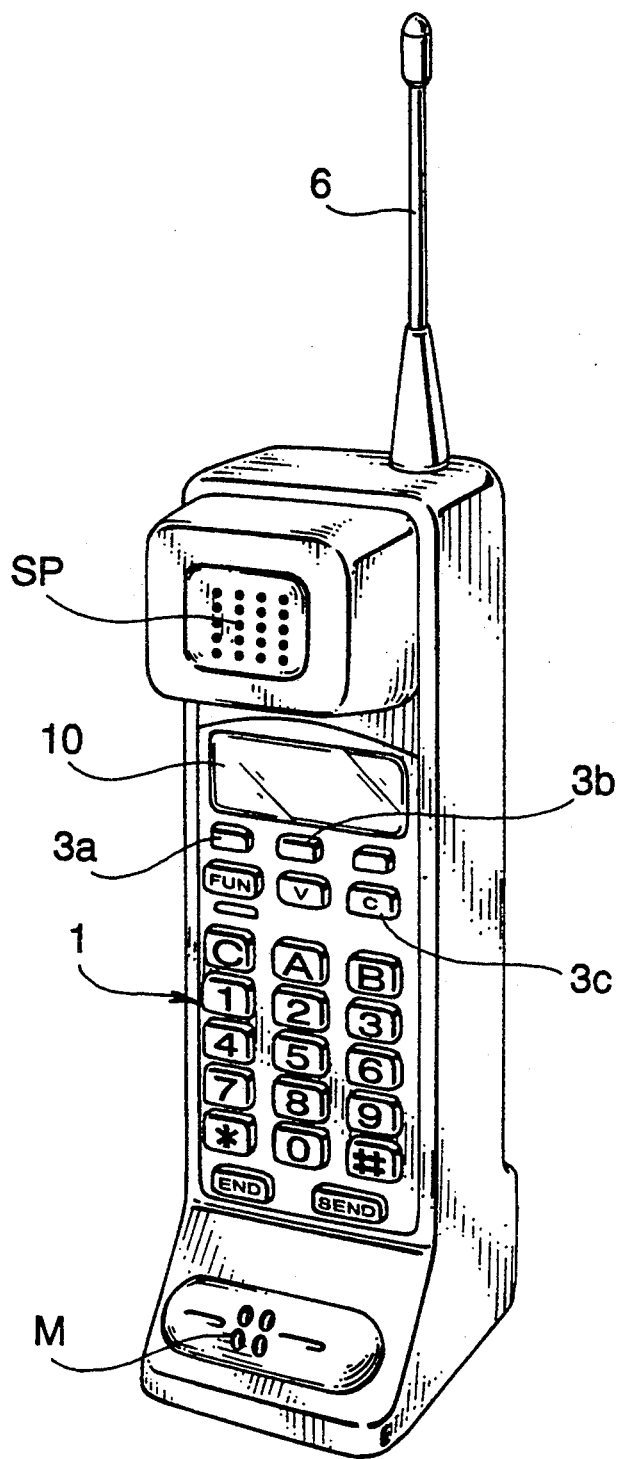
FIG. 3 shows an overall view of the wireless telephone according to the present invention.

The micro computer-equipped control part 5, display part 10, key operation part 1, microphone M, speaker SP, wireless reception part 8, wireless transmission part 7 and other elements are integrated as one unit to form a compact and portable handset (main body). An overall view of the unit has a configuration of portable telephone as illustrated shown in FIG. 3. Although numerals 3a, 3b and 3c respectively designate the selection switches to select tile no push-tone output mode, the normal push-tone output mode and the prolonged push-tone output mode, it may be possible not to provide these three selection switches individually, and instead a combinational operation of a part of the ten-key may substantially constitute the mode selection switches.

Figure 4:
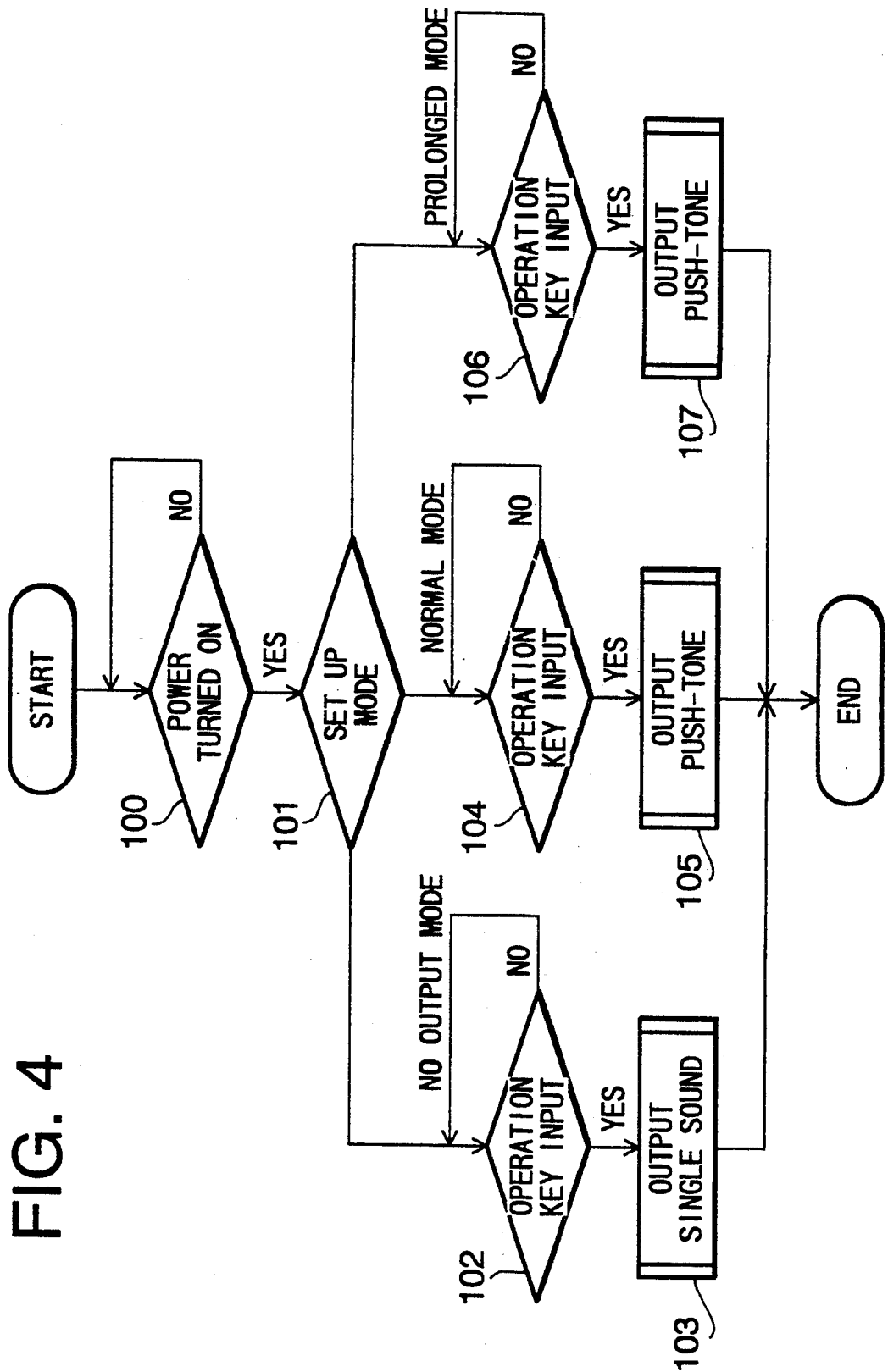
FIG. 4 shows a flowchart useful to explain a basic operation procedure of the wireless telephone of the present invention.

The steps 100–107 of a flowchart of FIG. 4 show a fundamental operation procedure of the wireless telephone according to the present invention. When the no push-tone output mode is selected by a selection operation of the push-tone signal mode selection switch 3, tile operation sound generating circuit 4 outputs the single sound signal to the speaker SP for a predetermined period of time as the operation key 1a (for example, the ten-key) of the key operation part 1 is manipulated, regardless of period of time of key manipulation (or how long the operation key 1a is kept pressed). In this case, however, the single sound signal is not delivered to the wireless transmission part 7.

When the normal push-tone output mode is selected by a selection operation of the push-tone signal mode selection switch 3, the operation sound generating circuit 4 outputs the push-tone signal to the speaker SP and the wireless transmission part 7 for a predetermined period of time respectively, regardless of period of time of the operation key 1a manipulation.

When the prolonged push-tone output mode is selected by a selection operation of the push-tone signal mode selection switch 3, the operation sound generating circuit 4 outputs the push-tone signal to the speaker SP and the wireless transmission part 7 for a period of time respectively, which period of time is a operation key pressing period of time. In this case, however, if the operation key 1a pressing period of time is not more than 150 msec, it is prolonged to 150 msec and then output.

Figure 5:
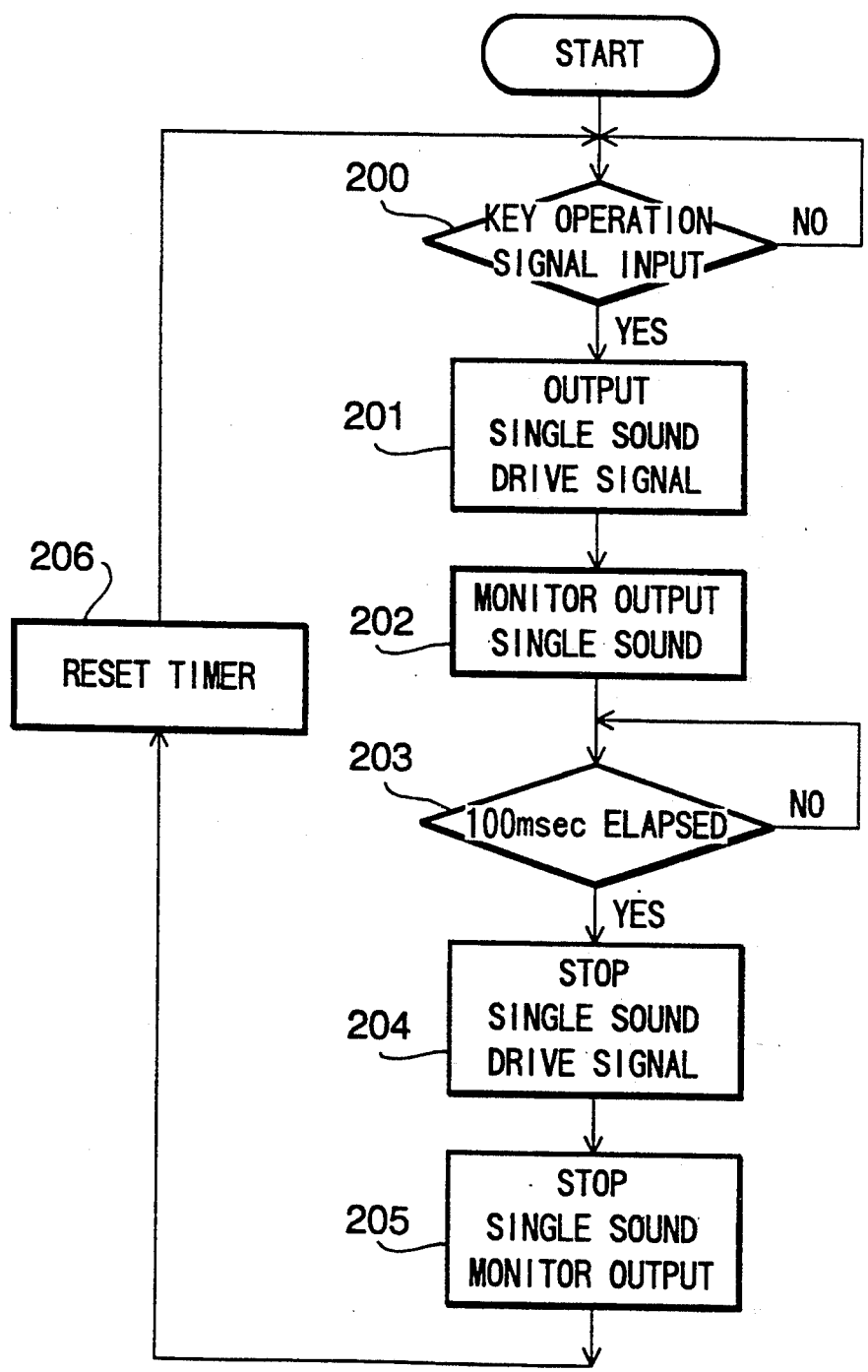
FIG. 5 illustrates a flowchart useful to explain a fundamental operation of a control part in a none push-tone output mode.
Figure 6:
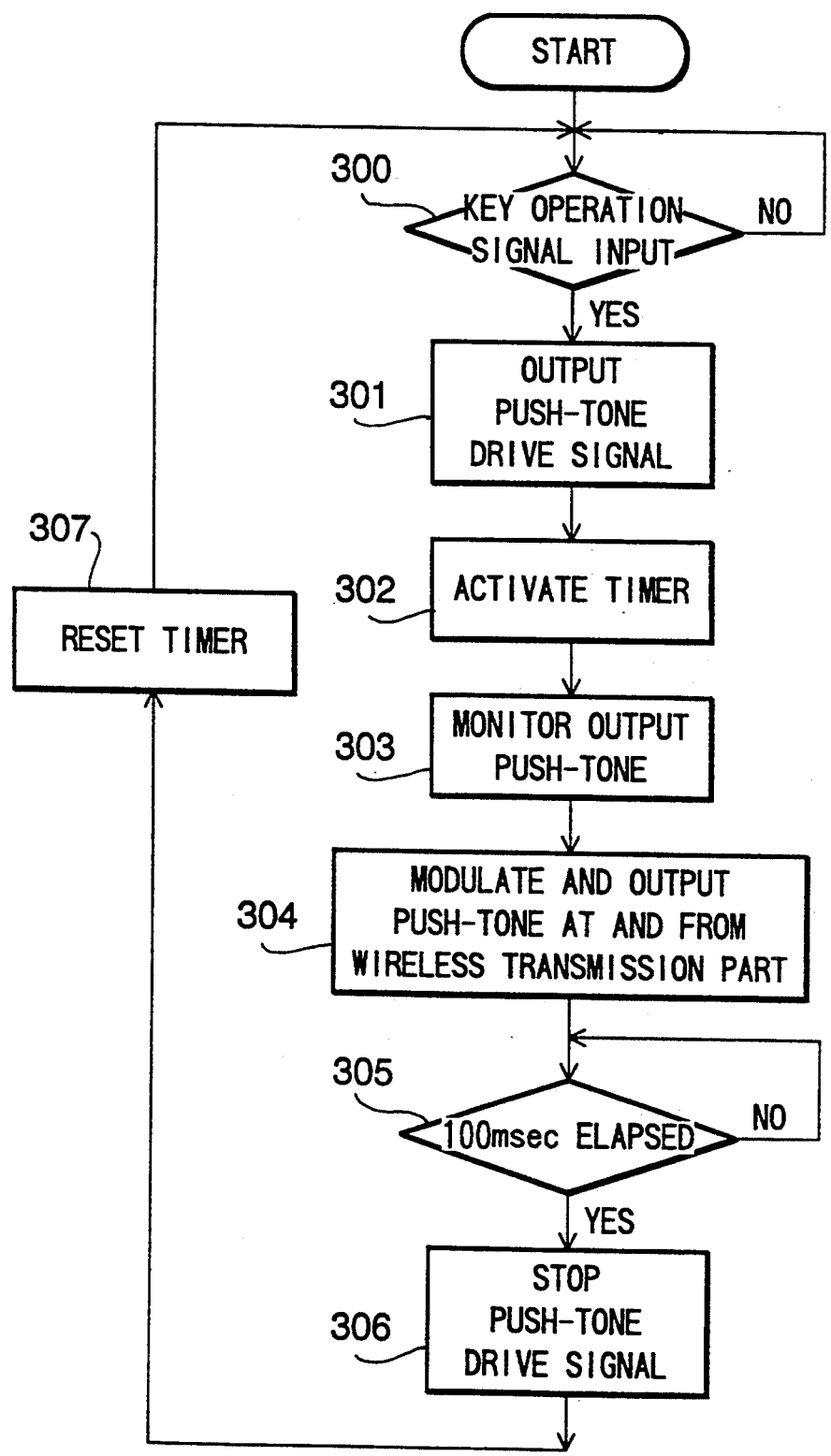
FIG. 6 is a flowchart useful to explain a fundamental operation of the control part in a normal push-tone output mode.
Figure 7:
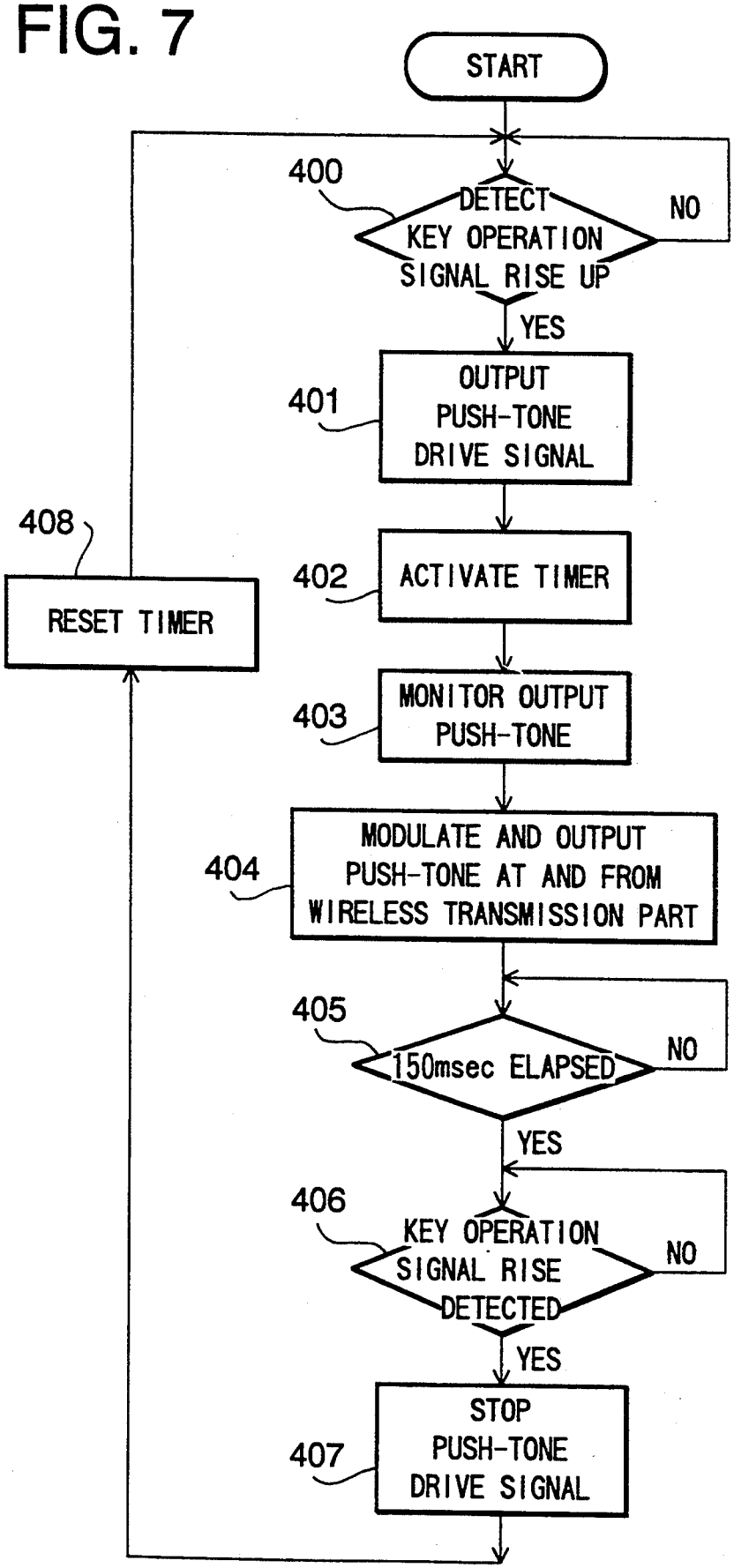
FIG. 7 illustrates a flowchart useful to explain a fundamental operation of the control part in a prolonged push-tone output mode.

FIGS. 5 to 7 show operations of the control part in the no push-tone output mode, the normal push-tone output mode and the prolonged push-tone output mode, respectively.

In the case of the no push-tone output mode, every time the key operation signal is input from the key input control part 2, the single sound drive signal is sent to the operation sound generating circuit 4 for a predetermined period of time (100 msec) so that the single sound is output from the speaker SP (see the steps 200-206 in FIG. 5).

In the case of the normal push-tone output mode, every time the key operation signal is input from the key input control part 2, the push-tone drive signal is delivered to the operation sound generating circuit 4 for a predetermined period of time (100 msec). As a result, the push-tone is monitor output from the speaker SP and at the same time the radio frequency signal modulated with the push-tone is output from the wireless transmission part 7 (see the steps 300-307 in FIG. 6).

In the case of the prolonged push-tone output mode, every time the key operation signal is input from the key input control part 2, the push-tone drive signal is output at its rise-up, and the push-tone drive signal is kept output till the key operation signal from tile key input control part 2 is stopped. The outputting of the push-tone drive signal stops as the inputting of the key operation signal stops, but if the operation key 1a pressing period of time is not more than 150 msec, the push-tone drive signal outputting period is prolonged to 150 msec. And, upon monitor outputting the push-tone from the speaker SP, the radio frequency signal modulated with the push-tone is output from the wireless transmission part 7 (steps 400-408 in FIG. 7).

Figure 8A:
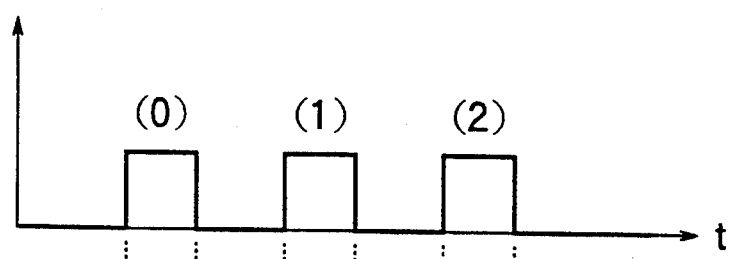
FIGS. 8A–8B is a set of views showing a relation between an operation key pressing manipulation and a monitor output of single sound in the none push-tone output mode.
Figure 8B:
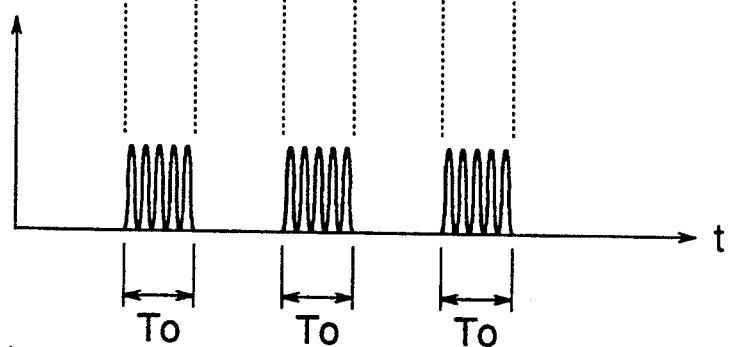
Figure 9A:
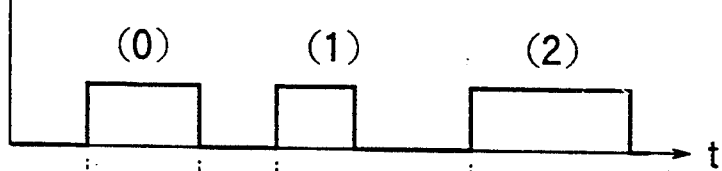
FIGS. 9A–9B is a set of views showing a relation between the operation key pressing manipulation and a push-tone monitor output in the normal push-tone output mode.
Figure 9B:
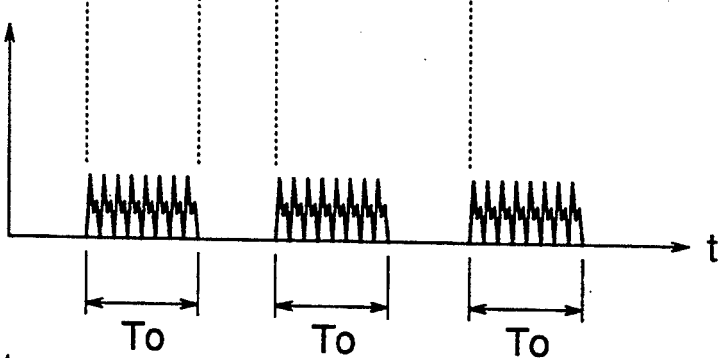
Figure 10A:
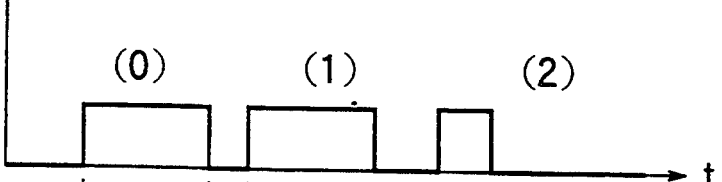
FIGS. 10A–10B is a set of views showing a relation between the operation key pressing manipulation and the push-tone monitor output in the prolonged push-tone output mode.
Figure 10B:
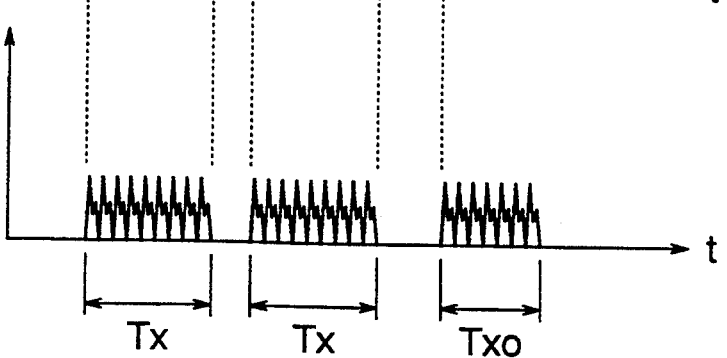

FIGS. 8-10 show the monitor outputs in relation to the operation key pressing manipulation during the none push-tone output mode, the normal push-tone output mode and the prolonged push-tone output mode of the wireless telephone A according to the present invention, respectively.

Illustrated in these drawings are forms of output of the monitor sound in response to the pressing manipulation of the ten-key ([0], [1] and [2]). As seen from the illustrations, when the telephone A is in the no push-tone output mode or normal push-tone output mode, the single sound or push-tone signal is output from the speaker SP for a constant period of time To (for example, 100 msec), independent of the length of the operation key pressing time. On the other hand, when the telephone is in the prolonged push-tone output mode, the push-tone is output through the speaker SP for a period of time equal to the operation key manipulating time Tx. In this mode, if the pressing operation of the operation key 1a finishes before 150 msec elapses, the push-tone outputting period of time is automatically extended to 150 msec (see FIG. 10 (b), Txo).

According to the wireless telephone of the present invention, it is possible to select one of three output modes, namely the no push-tone output mode, normal push-tone output mode and prolonged push-tone output mode by manipulating the push-tone signal mode selection switch. The push-tone is output as the key operation part is operated and different push-tones are output depending on the selected output mode. Such a selection is performed by manipulating the push-tone signal mode selection switch. As mentioned above, the single sound is output from the speaker if the no push-tone output mode is chosen, and the operation sound output to the speaker at a time of the operation key manipulation becomes the push-tone if the push-tone output mode (both normal and prolonged modes) is chosen. Therefore, it is not necessary to see the telephone setting state indication to confirm the setting state of the wireless telephone.

Accordingly, a careless mistake such as unexpectedly producing the push-tone during the communication can be avoided and a problem such as not outputting the push-tone during the push-button telephone service is eliminated.

We claim:

1. A wireless telephone comprising:
    a key input control part for outputting a key operation signal corresponding to a pressed operation key;
    a push-tone signal mode selection switch for switching and setting a push-tone signal mode in response to a key pressing operation into one of a no push-tone output mode, a normal push-tone output mode and a prolonged push-tone output mode, and for outputting a mode selection signal;
    a operation sound generating circuit for generating an operation sound; and
    a control part for sensing an operation sound signal to the operation sound generating circuit in response to a reception of the key operation signal nd the mode selection signal, the operation sound signal corresponding to a selected signal output mode.

2. The wireless telephone of claim 1, further comprising:
    a portable-size main body; and
    an antenna provided on the main body for transmitting and receiving electric waves.

3. The wireless telephone of claim 1, further comprising:
    a key operation part having a ten-key for specifying a telephone number and for using a push-button telephone service.

4. The wireless telephone of claim 1, wherein the key input control part includes a key matrix control circuit.

5. The wireless telephone of claim 1, further comprising:
    a speaker for transducing and outputting the operation sound signal as an audio frequency tone.

6. The wireless telephone of claim 1, further comprising:
    a speaker for outputting an operation sound consisting of a single sound if the no push-tone output mode is selected.

7. The wireless telephone of claim 1, where in the control part does not transmit the push-tone to a party to which an user of the wireless telephone talks if the no push-tone output mode is selected.

8. The wireless telephone of claim 1, further comprising:
a speaker for outputting a push-tone signal sound having a predetermined length if the normal push-tone output mode is selected.

9. The wireless telephone of claim 1, wherein the control part transmits a push-tone signal sound having a predetermined length to a party to which an user of the wireless telephone talks if the normal push-tone output mode is selected.

10. The wireless telephone of claim 1, wherein the operation sound signal has a length sufficient to prevent a wireless transmission error if the normal push-tone output mode is selected.

11. The wireless telephone of claim 1, further comprising:
a speaker for outputting a push-tone signal sound for as long as the operation key is pressed if the prolonged push-tone output mode is selected.

12. The wireless telephone of claim 1, wherein the control part transmits a push-tone signal sound to a party to which an user of the wireless telephone talks for as long as the operation key is pressed if the prolonged push-tone output mode is selected.

13. The wireless telephone of claim 1, wherein when the prolonged push-tone output mode is selected, the control part generates a push-tone signal for a predetermined period of time if an operation key is not pressed for more than a predetermined period, and the control part generates the push-tone signal sound for as long as the operation key is pressed if the operation key is pressed for more than the predetermined period.

14. The wireless telephone of claim 1, wherein the control part generates a push-tone signal sound of a length sufficient to enable remote control use of a push-button service if the prolonged push-tone output mode is selected.

15. The wireless telephone of claim 1, further including:
an antenna for transmitting and receiving a radio frequency signal;
a wireless transmission part for modulating the radio frequency signal and transmitting it from the antenna;
a wireless reception part for receiving a radio frequency signal at the antenna and demodulating the received radio frequency signal to pick up a signal-reception signal;
a duplexer connected to tile antenna; and
a PLL circuit for performing a frequency setting of the wireless reception part and tile wireless transmission part.

* * * * *